3,212,946
MORTAR COMPOSITION COMPRISING A MIXTURE OF A LIQUID EPOXY RESIN WITH SUFFICIENT WATER TO GEL SAID RESIN
Ernest E. Weller, Sayreville, and Robert J. Kleinhans, Highland Park, N.J., assignors to Tile Council of America, Inc., New York, N.Y., a corporation of New York
No Drawing. Filed Sept. 26, 1961, Ser. No. 140,660
14 Claims. (Cl. 156—71)

The present invention relates to covering substrata with vitreous and non-vitreous ceramic tile and the like, and to improved liquid epoxy resin compositions which provide strong firm bonds between the substrata and tile, and strong, firm, crack-free and flexible joints between the tiles.

When conventional epoxy resin compositions are used, as jointing compounds for example, to fill the spaces between tiles and the like, or to join the edges of adjacent tiles, they have a tendency to flow or sag with time.

It has been suggested to impart flow resistance and non-sagging properties to such compositions by the addition of finely divided inert solids, e.g., fillers, pigments, and so forth, as well as certain other reactive and non-reactive extenders. Such materials have been added to both high viscosity and low viscosity grade epoxy resins.

The resulting blends, however, have several disadvantages: (1) the additives described increase the viscoisty of the composition, thereby requiring increased work during application and cleaning; (2) increased viscosity does not prevent flow or sag of these compositions, but merely retards such deleterious properties for some indefinite period of time; and (3) occasionally, these prior art compositions come in three different parts requiring the user to mix a filler portion and a hardener portion into an epoxy resin portion to provide the working properties desired. Such mixing at the job site opens the door to non-uniform "blends," which are all too frequently considered "equals" by the mixer.

It is an object of the present invention to provide liquid epoxy resin compositions containing relatively small amounts of finely divided inert solid materials, and having a stable gel-like structure, which, when reacted with a suitable cross-linking agent, produce cured adhesives which are substantially free of the deleterious sag and flow properties discussed hereinabove and inherent in conventional epoxy resin compositions.

It is a further object of the present invention to provide epoxy resin adhesive compositions which may be emulsified in and readily removed by water.

A further object of the present invention is to provide a method for grouting and setting tile with the improved epoxy resin adhesive compositions disclosed herein.

Other objects of the invention will in part be clear and will in part be obvious from the following description.

According to the present invention, it has been discovered that addition of small amounts of water to epoxy resin compositions comprising finely divided inert solids produces a gel-like structure in the composition which is extremely stable on storage. The resulting epoxy resin gel can be hardened by addition of a suitable cross-linking agent, to produce epoxy resin adhesive compositions which are free from the deleterious flow and sag properties described hereinabove.

The resinous epoxides suitable for use in the present invention comprise those compounds having at least two epoxy groups, i.e., at least two

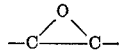

groups. The polyepoxides may be saturated or unsaturated, aliphatic, cycloaliphatic, or heterocyclic and may be substituted if desired with substituents such as chlorine atoms, hydroxyl groups, ether radicals, and the like. They may also be monomeric or polymeric.

Examples of the polyepoxides include, among others, epoxidized glycerol dioleate, 1,4-bis(2,3-epoxypropoxy) benzene, 1,3-bis(2,3-epoxypropoxy) benzene, 4,4'-bis (2,3-epoxypropoxy)diphenyl ether, 1,8 - bis(2,3 - epoxypropoxy)-octane, 1,4 - bis(2,3 - epoxypropoxy) - cyclohexane, 4,4' - bis(2-hydroxy-3,4'-epoxybutoxy) - diphenyldimethylmethane, 1,3-bis(4,5-epoxypentoxy)-5-chlorobenzene, 1,4-bis(3,4-epoxybutoxy)-2-chlorocyclohexane, 1,3-bis(2-hydroxy-3,4-epoxybutoxy) benzene, 1,4-bis and (2-hydroxy-4,5-epoxypentoxy) benzene.

Among the preferred epoxides are the epoxy polyethers of polyhydric phenols obtained by reacting a polyhydric phenol with a halogen containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl) propane (bis-phenol A), 2,2-bis(4-hydroxyphenyl) butane, 4,4 - dihydroxybenzophenone, bis(b-hydroxyphenyl) ethane, 2,2-bis(4-hydroxyphenyl) pentane, and 1,5-dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula:

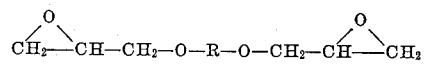

wherein R represents a divalent hydrocarbon radical of the dihydric phenol. The polymeric products will generally not be a single simple molecule but will be a complex mixture of glycidyl polyethers of the general formula:

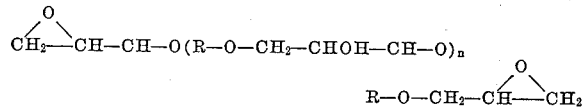

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number. The polyethers may in some cases contain a very small amount of material with one or both of the terminal glycidyl radicals in hydrated form.

The aforedescribed glycidyl polyethers of the dihydric phenols may be prepared by reacting the required proportions of the dihydric phenol and the epichlorohydrin in an alkaline medium. The desired alkalinity is obtained by adding basic substances, such as sodium or potassium hydroxide, preferably in stoichiometric excess to the epichlorohydrin. The reaction is preferably accomplished at temperatures within the range of from 50° C. to 150° C. The heating is continued for several hours to effect the reaction and the product is then washed free of salt and base.

These epoxide resins are available in several forms varying from a viscous liquid to a solid resin. Especially suitable are those resins which are liquid or near their softening point at room temperature.

Typical of the epoxy resins which may be employed are the epichlorohydrin-bis-phenol type sold under the trademarks "Epon Resins," "Gen Epoxy," "DER Resins," "ERL Resins," "Epi-Rez"; the peracetic acid-epoxidized compounds sold under the trademark "Unox Diepoxides"; and the trifunctional epoxy compounds sold under the trademark "Epiphen." An example of the trifunctional type of compounds is "Epiphen ER–823," which has the following formula:

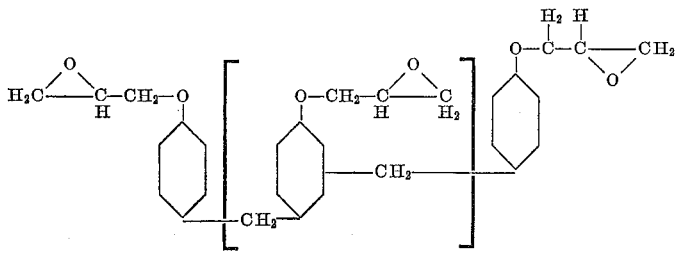

The epoxide resins suitable for use in the present invention should contain between about 5 and 400 percent, and preferably between about 10 and 300 percent, by weight, based on the weight of epoxy resin, of an inert, finely divided solid.

The amount of water added to the described epoxy resin compositions to produce the gel structure may vary between about 0.5 and 15 percent by weight of the epoxy resin.

Suitable finely divided inert solid materials for use in the present invention include fillers, such as asbestos, albalith, silica, mica, flint powder, quartz, kryolite, Portland cement, limestone, atomized alumina, barytes, talc, pyrophyllite, various clays, diatomaceous earth, and other like materials. Also may be mentioned pigments, such as titanium dioxide, cadmium red, carbon black, aluminum powder, and the like.

Suitable other colorants may be added to the epoxy resin if desired. Typical of these are: National Fast Red; Calco Condensation Green A.Y.; Calco Condensation Blue; Bismarck Brown; Blue Lake (13% Ponsal Blue, BP–179–D, Blue Lake Krebs BP–258–D, Lithol Tower, chrome yellow, iron blue, Milari blue, Monastral green, maroon toner, chrome green, chrome orange, iron oxide reds, aluminum powder, and flatting agents like diatomaceous silica and silica aerogel. The color materials should be selected, however, so as to be non-reactive with the epoxy resins and other ingredients at atmospheric temperature, as otherwise this might cause poor storage stability and also affect the retention of adhesiveness.

The finely divided inert solid materials suitable for use herein may have an average particle size ranging between about 50 mesh and 400 mesh, and preferably between about 100 and 400 mesh (U.S. Std. Series). The exact size of the inert finely divided solid materials will depend upon the particular application of the compositions.

In addition to finely divided solid materials, a wide variety of resinous modifiers may be added to the epoxy resin systems disclosed herein. Among these may be mentioned the phenolic resins, such as aniline formaldehyde resins; urea resins, such as urea formaldehyde resins; melamine resins, such as melamine formaldehyde resins; polyester resins, such as those produced from polybasic acids and polyhydroxyl alcohols, and which may contain free carboxyl groups and/or aliphatic hydroxyls capable of reacting with the epoxy resins; vinyl resins such as vinyl chloride, vinylidene chloride, and the like; isocyanate resins (polyurethanes), characterized by the extremely reactive —N—C—O radical, which is capable of reacting with hydroxyl groups present in the epoxy resin chain, typical of which are the monomeric diisocyanates, such as tolylene diisocyanate, diphenyl methane 4,4'-diisocyanate, and 3,3'-butolylene 4,4'-diisocyanate; fluorocarbon resins, such as polytetrafluoroethylene, polytrifluoromonochloroethylene, and the like; and silicone resins. The addition of such resinous modifiers is well understood in the art. The resinous modifiers may vary from about 1 to about 100 percent or more, by weight, based on the weight of the epoxy resin.

An especially suitable resinous modifier for use in the present invention is polystyrene resin, and this resinous modifier is preferred. The polystyrene resin should vary from about 10 to about 50 percent, and preferably from about 20 to 40 percent, by weight, based on the weight of the epoxy resin. Polystyrene resin, it has been discovered, considerably enhances the flexibility of the bonds produced with the epoxy resin compositions disclosed herein.

Any suitable curing or cross-linking agent may be used with the epoxy resin compositions described. Typical of these may be mentioned the amine curing agents, i.e., amines containing at least 1 and preferably at least 2 amino nitrogen atoms, such as ethylene amine, ethylene diamine, propylene diamine, diethylene triamine, dipropylene triamine, triethylene tetramine, tripropylene tetramine, tetraethylene pentamine, tetrapropylene pentamine, and mixtures of the foregoing. Also may be mentioned higher alkyl polyamines, such as alkyl polyamines in which the alkyl group is butyl, hexyl, octyl, and so forth.

Due to their greater availability, commercially produced polyfunctional amines may be used in this invention with equal success to that obtained using pure amines. Examples of such commerically available amines are those obtained under the trade names "Duomeen O" and "Duomeen S." "Duomeen O" consists essentially of a mixture of N-alkyl trimethylene diamines derived from technical grade oleic acid. The alkyl group content is distributed as follows:

| | Percent |
|---|---|
| C–14 | 2 |
| C–16 | 5 |
| C–18 | 93 |

"Duomeen S" consists essentially of a mixture of N-alkyl trimethylene diamines derived from soya acids. The alkyl group content is distributed approximately as follows:

| | Percent |
|---|---|
| C–16 | 13 |
| C–18 | 87 |

As suitable curing agents may also be mentioned diols such as bis-phenol A, diethylene glycol, dipropylene glycol, pinacol and the like. Suitable curing agents also include phenols and alcohols, as is well understood in the art. See, for example, Lee et al., Epoxy Resins, McGraw-Hill, 1957, pp. 63 to 140. With such curing agents, suitable catalysts such as the alkli metal hydroxides, benzyl dimethylamine, and benzyl trimethyl ammonium hydroxide may be used in the manner well understood in the art. Suitable organic acids and acid anhydrides may also be used as curing agents. Typical of these are the monocarboxylic and dicarboxylic acids containing up to 10 or more carbon atoms, acetic anhydride, phthalic anhydride, and the like. The use of the above curing or cross-linking agents is well under stood in the art.

Preferred curing or cross-linking agents for the epoxy resin composition disclosed herein are certain poly-amido-amine epoxide hardeners.

The poly-amido-amine epoxide hardeners are produced by copolymerization of polyamines with polycarboxylic acids, the copolymerization reaction being permitted to proceed to such an extent that the products produced are soluble in both epoxy resin and water.

In conducting the polymerization reaction, it is important that excess polyamine be used, so that unreacted polyamine is present in the resulting copolymer. In the case where no unreacted amine remains, water solubility is lost and the products do not possess the required ability to harden and epoxide polymer. Nor are such reaction products soluble in the epoxy resin and water.

Suitable amine hardeners are prepared by reacting the polyamines and polycarboxylic acids described herein at temperatures below the decomposition temperature of the polyamines by employing the appropriate polyamine in stoichiometric excess of that theoretically required to react with the appropriate polycarboxylic acid. The temperature of the reaction is preferably between about 100° and 200° C. Especially good results are achieved when the temperature is between about 120° and 160° C.

Aliphatic polyamines containing two or more amino nitrogens may be used to produce such poly-amido-amine hardeners. Polyamines containing primary nitrogens are especially suitable.

Polyamines suitable for making the poly-amido-amine compounds disclosed herein have the formulae:

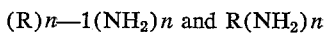
(R)$n$—1(NH$_2$)$n$ and R(NH$_2$)$n$ where R is a hydrocarbon radical and $n$ is an integer having a value of at least 2, and preferably between about 4 and 10. Such polyamines should have a formula weight of at least 60 and preferably between about 90 and 500.

Examples of polyamines that may be used to produce such hardeners include ethylene diamine, propylene diamine, diethylene triamine, dipropylene triamine, triethylene tetramine, tripropylene tetramine, tetraethylene pentamine, tetrapropylene pentamine, and mixtures of the foregoing. Also may be mentioned higher alkyl polyamines satisfying the above formulae, such as alkyl polyamines in which the alkyl group is butyl, hexyl, octyl and so forth. The hydrocarbon radical R$_1$ attached to the amino nitrogen atoms may have up to 50 carbon atoms or more. Preferably, however, the hydrocarbon radical has fewer than about 30 carbon atoms.

Especially suitable are polyamines which have a value of $n$ of at least 4, or polyamines wherein the formula weight of R is greater than about 90. It has been found that where polyamines are used in which $n$ is an integer less than 4, or R is of a molecular weight lower than 90, satisfactory hardening action is not obtained. This is believed to be due in part to the reaction of such low molecular weight polyamines with polycarboxylic acids to form compounds having a high melting point, which compounds require high reaction temperatures, e.g., above the decomposition temperature of the polyamines, to effect the fusion which precedes the amidation reaction. The same problems are experienced when, for example, a polycarboxylic acid, e.g., R(COOH)$_2$, is employed wherein R is of low molecular weight. A further difficulty found to exist when low molecular weight polyamines and polycarboxylic acids are used is that the reaction products produced are insoluble in epoxide polymers and therefore are not able to function as hardeners.

The polycarboxylic acids suitable for reaction with the above described polyamines to produce the poly-amido-amine epoxide hardeners have at least two carboxyl groups and may be represented by the formula R(COOH)$_n$, where R is a hydrocarbon radical which may be saturated or unsaturated, aliphatic, cycloaliphatic, or heterocyclic, and $n$ is an integer having a value of at least 2. Among the preferred polycarboxylic acids are the straight chained saturated dicarboxylic acid such as adipic, pimelic, suberic, azeloic, sebacic, nonone dicarboxylic acid, and the higher members of this series, including mixtures thereof. Also may be mentioned the straight chained unsaturated dicarboxylic acids, including citraconic acid, mesaconic acid and itaconic acid. Especially suitable for use are the so-called resin acids. These may be classified as diterpene acids, a major constituent being abietic acid. When such diterpene acids are dimerized, a dicarboxylic acid results. Particularly useful are those diterpene acids which, upon being dimerized, have a formula weight of about 300 to 900, and preferably between about 500 to 600.

The poly-amido-amine epoxide hardeners are produced by dissolving the polycarboxylic acid and polyamine in a sutable organic solvent, in which the polyamine and the polycarboxylic acid are soluble. The amount of the polyamine is in excess of that stoichiometrically required to react with the polycarboxylic acid. The amount of excess polyamine is preferably at least about 5 percent, and may be between about 5 and 200 percent, or higher, and preferably between about 50 and 150 percent, based on the polycarboxylic acid. The solvent employed is not critical, since after mixing the solvent is preferably removed, for example by evaporation. The residue remaining after solvent evaporation is the heated to a temperature of between about 100 to 200° C., care being taken that the temperature employed to below the decomposition temperature of the polyamine used. The time of heating should be at least about one-half hour, or between about 1 and 25 hours, and is preferably between about 1 and 16 hours. Although the solvent is preferably removed prior to heating, it should be understood that the solvent may also be removed after heating.

The preferred poly-amido-amine epoxide hardeners described herein above, when added to the epoxy resin compositions described produce adhesive compositions which cure readily to a strong, firm bond, and are readily cleanable by water.

Specific examples embodying the teachings set forth above are here given by way of exemplification and not restriction.

*Example 1*

An epoxide resin of the epichlorohydrin-bisphenol of acetone type, having a viscosity of about 4,000 to 10,000 centipoises (20° C.), an epoxide equivalent of approximately 180, and a melting point in the range of 8–12° C. was used in this example. The structural formula of the epoxide resin may be represented as follows:

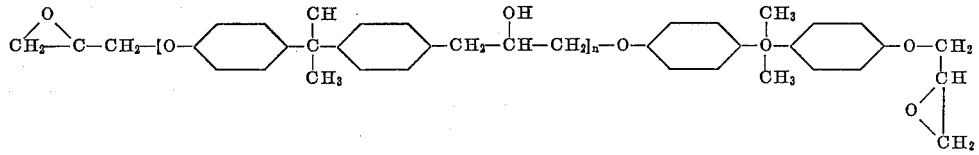

This resin was purchased under the trade name Epon 820.

The following composition was prepared:

|  | Weight, parts |
|---|---|
| Epoxide resin (Epon 820) | 620.0 |
| Polystyrene resin | 182.0 |
| Barytes | 700.0 |
| TiO$_2$ | 300.0 |

To aliquots of the combined composition was added water in the amount of 1%, 2%, 5%, 8% and 12%, respectively. In each aliquot, a gel was formed which was very stable on aging.

The aliquot containing 5% of water was cured by the addition thereto of diethylene triamine. The amount of diethylene triamine added amounted to 10% by weight, based upon the weight of the epoxide resin and the polystyrene resin present in the gelled resinous composition indicated above.

This mixture yielded a very workable material satisfactory for grouting tile. The resulting adhesive exhibited good flow resistance and non-sagging properties in the tile joints and readily cured to a hard, crack-free joint.

*Example 2*

The prime poly-amido-amine hardener was prepared by dissolving 14.6 parts by weight of adipic acid in 100 parts by weight of ethyl alcohol and to this mixture were added 40.0 weight parts of N-octadecene trimethylene diamine. After solution was effected, the resulting mixture was heated to evaporate the alcohol, then placed for 16 hours in an oven held at 120° C. Upon cooling an orange-brown paste was obtained. This was slowly soluble in an equal weight of water yielding a gelatinous solution.

A resin base and pigment hardener composition were prepared.

The resin base was made up as described in Example 1 and had the following composition:

| | Percent by weight |
|---|---|
| Epoxide resin (Epon 820) | 29.86 |
| Polystyrene resin | 8.89 |
| Titanium dioxide | 19.27 |
| Blanc fixe | 39.04 |
| Water | 2.40 |
| | 100.0 |

The pigment-hardener composition had the following composition:

| | Percent by weight |
|---|---|
| Poly-amido-amine hardener | 31.90 |
| TiO₂ | 8.62 |
| Blanc fixe | 45.69 |
| Silica (325 mesh) | 13.79 |
| | 100.0 |

The epoxide resin used was the same as that described in Example 1. The poly-amido-amine epoxide hardener was that prepared in this example, supra.

1.5 parts by weight of the resin base were mixed with 1.0 part by weight of the pigment-hardener composition, and a smooth, easily spreadable composition was produced. The composition was spread over a wall surface to which was adhered glazed ceramic tiles in spaced relation. The joints between the tiles were thus filled with this grouting composition. Excess material was removed from the face of the tiles by scrapping with a trowel edge and then wiped clean with a water-soaked cotton cloth. A smooth, hard, impermeable grout joint was thus obtained which exhibited extremely good flow resistance and non-sagging properties.

*Example 3*

This example was run with a trifunctional type of epoxy resin, sold under the trade name Epiphen ER 851, and this epoxy resin may be represented by the following structural formula:

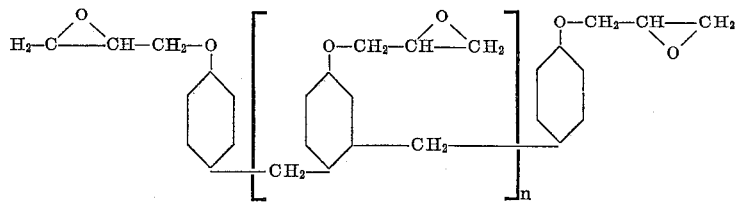

Using the epoxy resin described, the following formulation was prepared:

| | Weight, parts |
|---|---|
| Epoxide resin (Epiphen ER 851) | 612.0 |
| Polystyrene resin | 182.0 |
| Barytes | 700.0 |
| TiO₂ | 300.0 |

To aliquots of the above composition were added water in the amount of 1%, 2%, 5%, 8% and 12%, by weight, respectively. In each case, a gel was formed which was very stable on aging.

The aliquot containing 5% by weight of water was cured using the hardener of Example 1. Similar results were obtained.

*Example 4*

Example 2 was repeated, with the exception that Epiphen ER 851 was substituted for Epon 820. Similar results were obtained.

*Example 5*

In this example, a diepoxy resin obtained under the trade name Unox 201 and which may be represented by the following chemical structure was employed:

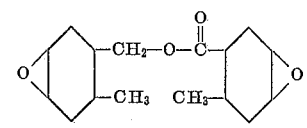

The following composition was prepared:

| | Parts by weight |
|---|---|
| Epoxide resin (Unox 201) | 61.2 |
| TiO₂ | 100 |

Water was slowly added to the resulting composition. When the water content was about 1% by weight, a gel formed. Water addition continued until 5% by weight of water had been added, and the resulting gel was stored for more than a month. The gel remained stable during storage over this period of time.

*Example 6*

The epoxy resin used in this example was obtained under the trade name DER–332, and can be represented by the following structural formula:

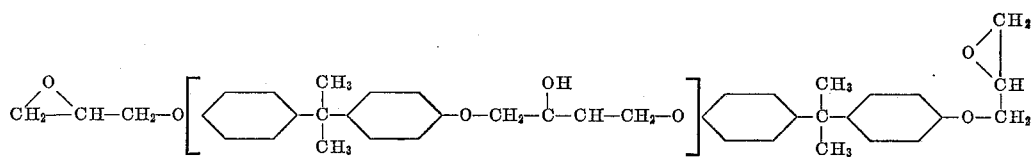

The following composition was prepared:

| | Parts by weight |
|---|---|
| Epoxy resin (DER-332) | 612 |
| Polystyrene resin | 184 |
| Barytes | 100 |

To aliquots of this composition were added water in an amount of 1%, 2%, 5%, 8% and 12%, respectively. A gel was formed in each case which was stable on aging.

The aliquot containing 5% water was cured using the hardening agent of Example 1. Results similar to those of Example 1 were obtained.

Example 7

Example 2 was repeated, with the exception that DER-332 of Example 6 was substituted for Epon 820. Similar results were obtained.

Example 8

A resin base and pigment hardening composition were prepared using the following formulae:

| Resin base | Percent by weight |
|---|---|
| Epoxide resin (DER-332) | 68.0 |
| Polystyrene | 20.0 |
| Barytes | 10.0 |
| Water | 2.0 |
| Pigment-hardener composition: | |
| Duomeen O | 50.0 |
| Barytes | 42.0 |
| $TiO_2$ | 8.0 |

The resin base was prepared as described in Example 1. The Duomeen O epoxy hardener has been described hereinabove.

One part of the resin base was mixed with one part of the pigment hardener composition and the resulting composition was white, and easily spreadable. The composition was also trowelled over the set glazed ceramic tiles. The joints between the tile were thus filled with the composition. Excess material was removed from the face of the tiles by scraping with a trowel edge and then wiping clean with a water-soaked cotton material. A smooth, hard, crack-free impermeable grout joint was thus obtained, between the tiles, the resulting joints exhibiting good flow resistance and non-sagging properties. A bed of the composition was spread on a substrate of cement and glazed ceramic tiles were set therein in spaced relationship, a space of about 3/8" separating the individual tiles. The bond between the tiles and substrate was firm and solid and had very good strength characteristics.

Example 9

Using the epoxide resin of Example 1, the following composition was prepared:

| | Parts by weight |
|---|---|
| Epoxide resin | 48.8 |
| Titanium dioxide | 80.0 |

Water additions of from 1 to 5% by weight of the composition were made, and gels were formed which remained stable under prolonged periods of storage.

Example 10

Using the epoxide resin of Example 1, the following composition was prepared:

| | Parts by weight |
|---|---|
| Epoxide resin | 48.8 |
| Barytes | 80.0 |

Water was added to the resulting composition in amounts of from 1 to 5% by weight. Upon addition of this amount of water gels formed which were stable under prolonged periods of storage.

Example 11

The composition of Example 2 was used to patch eroded joints of ceramic tile floor which had been in service for some years in a dairy "cooler room." Full, hard, durable joints were obtained.

As is clear from the foregoing examples, the hardener may have incorporated therein finely divided inert solid materials in the same manner and in about the same proportions as the epoxy resin compositions. The finely divided inert solid materials suitable for use in the hardening compositions may be the same as those described hereinabove in connection with the epoxy resin compositions.

The following examples indicate the importance of usig excess amine in preparing the preferred poly-amido-amine epoxide hardeners described herein.

Example 12

Following the procedure of Example 2, stoichiometric amounts of dimerized tall oil resin were reacted with the following amines by heating at 155° C. for 1 hour:

Ethylene diamine
Diethylene triamine
Tetraethylene pentamine
N-alkyl ($C_{14-18}$) trimethylene diamine The products of these reactions were individually substituted for the hardener of Example 2. When the hardener portion was added to the resin base portion, the resulting adhesive compositions did not effectively harden, and did not exhibit the water-cleanability characteristics of the adhesive composition of Example 2.

Example 13

Example 12 was repeated, with the exception that in preparing the poly-amido-amine hardener, the amines were added to the dimerized tall oil resins in an amount which was 100 percent in excess of that required to react with the dimerized tall oil.

When the products of reaction were substituted for the hardener of Example 2, the resulting adhesive compositions effectively and readily hardened.

The following example illustrates another method of producing still other important poly-amido-amine epoxy hardeners.

Example 14

10 weight parts of sebacic acid were dissolved in 385 parts of ethyl alcohol and to this were added 17.8 weight parts of "Duomeen S." The "Duomeen S" consisted of a mixture of N-alkyl trimethylene diamines derived from technical grade soya acids. The alkyl group content was distributed as follows: C-14, 2%; C-16, 5%; C-18, 93%. This solution was then heated to evaporate the alcohol and then heated at 155° C. for 2 hours. This soft resinous product obtained was substituted for the epoxy resin hardener of Example 2. Similar results were obtained.

The invention in its broader aspects is not limited to the specific steps, methods, compositions and improvements shown and described herein, but departures may be made within the scope of the accompanying claims without departing from the principles of the invention and without sacrificing its chief advantages.

What is claimed is:

1. A method of coating a substrate with tile which comprises covering the substrate with a bed of mortar, pressing the tile into the bed, the mortar being prepared by mixing a two component system, one of which components is a composition comprising a cross-linking agent for epoxy resin; and the second of which components is an epoxy resin gel composition comprising liquid epoxy resin, a finely divided inert solid, and based upon the weight of epoxy resin, 0.5 to 15% by weight of water, the amount of water being sufficient to produce a gel-like structure in the epoxy resin composition, and curing the composition to produce a firm bond between the substrate and tile.

2. The method of claim 1 in which the finely divided inert solid material is selected from the group consisting of sand, powdered limestone, powdered barytes, titanium dioxide, and mixtures of the foregoing.

3. In the method of bonding ceramic tiles in edge to edge relationship, the improvement which comprises filling spaces between adjoining tiles with a composition prepared by mixing two components, one of said components being a composition comprising an epoxy resin cross-linking agent, and the second of said components being an epoxy resin gel composition comprising liquid epoxy resin, a finely divided solid inert material, and based upon the weight of epoxy resin, 0.5 to 15% by weight of water, the amount of water being sufficient to produce a gel-like structure in the epoxy resin, and curing the composition to produce a hard-crack-free joint between the tiles.

4. In a method of coating a substrate with tile in which the tiles are spacedly adhered to the substrate, the improvement which comprises preparing an adhesive composition by mixing two components, one of said components being a composition comprising a cross-linking agent, and the second of said components comprising liquid epoxy resin, a finely divided inert solid material, and 0.5 to 15% by weight of water based upon the weight of epoxy resin; the amount of water being sufficient to produce a gel-like structure in the liquid epoxy resin; filling the spaces between the tiles with the resulting composition; and curing the composition to produce a hard-crack-free joint between the tiles.

5. An epoxy resin gel composition suitable to be hardened by a cross-linking agent which comprises, in admixture, a liquid resinous epoxy compound having terminal epoxy groups, a finely divided inert solid material, and between about 0.5 to 15% by weight of water, based upon the weight of the liquid resinous epoxy compound.

6. The composition of claim 5 wherein the finely divided inert solid material is present in an amount of between about 5 and 400% by weight of the liquid resinous epoxy compound.

7. The composition of claim 5 wherein the finely divided inert solid material is present in an amount of between about 10 and 300% by weight of the liquid resinous epoxy compound.

8. The composition of claim 5 which includes polystyrene resin.

9. An adhesive bonding composition comprising a liquid resinous epoxy compound having terminal epoxy groups, a finely divided inert solid material, an amido-amine cross-linking agent capable of entering into a reaction with the epoxy compound to cure the epoxy compound, and between about 0.5 to 15 percent by weight of water, based upon the weight of the liquid resinous epoxy compound, the amount of water being sufficient to produce a gel-like structure in the epoxy compound.

10. A two component system adapted to be mixed to produce an adhesive bonding composition which is resistant to flow and sag during hardening which comprises, as a first component, a cross-linking agent comprising an amido-amine epoxy resin hardener; and, as a second component, an epoxy resin gel composition comprising a liquid resinous epoxy compound having terminal epoxy groups, a finely divided inert solid material, and between about 0.5 to 15 percent by weight of water, based upon the weight of the liquid resinous epoxy compound, the amount of water being sufficient to produce a gel-like structure in the liquid resinous epoxy compound.

11. A two component system adapted to be mixed to produce an adhesive resinous bonding composition which is resistant to flow and sag during hardening, which comprises, as a first component, an amido-amine epoxy resin cross-linking agent; and, as a second component, an epoxy resin gel composition comprising epoxy resin, a finely divided solid inert material, and based upon the weight of epoxy resin, 0.5 to 15 percent by weight of water, the amount of water being sufficient to produce a gel-like structure in the liquid epoxy resin.

12. The composition of claim 10 wherein the cross-linking agent comprises a finely divided inert solid.

13. A method of preparing an adhesive composition which comprises mixing a first component comprising an epoxy resin cross-linking agent with a second component comprising liquid epoxy resin, finely divided inert solid material, and, based upon the weight of the epoxy resin, between about 0.5 and 15% by weight of water the amount of water being sufficient to produce a gel-like structure in the liquid epoxy resin.

14. In a method of installing ceramic tiles, the improvement which comprises using as the adhesive a composition comprising a liquid resinous epoxy compound having terminal epoxy groups, a finely divided inert solid material, an amido-amine cross-linking agent capable of entering into a reaction with the epoxy compound to cure the epoxy compound, and between about 0.5 to 15 percent by weight of water, based upon the weight of the liquid resinous epoxy compound, the amount of water being sufficient to produce a gel-like structure in the epoxy compound.

References Cited by the Examiner

UNITED STATES PATENTS

| | | | |
|---|---|---|---|
| 2,811,495 | 10/57 | Wittcoff et al. | 260—18 |
| 2,872,427 | 2/59 | Schroeder | 260—29.2 |
| 2,879,252 | 3/59 | Been et al. | 260—836 |
| 2,935,488 | 3/60 | Phillips et al. | 260—836 |
| 3,050,493 | 8/62 | Wagner et al. | 260—29.2 |

OTHER REFERENCES

Thiokol L/P Epoxy Concrete Adhesives, Hand Book of Application Methods, Thiokol Chemical Corp., Trenton, New Jersey (1959).

MURRAY TILLMAN, *Primary Examiner.*

LEON J. BERCOVITZ, *Examiner.*